March 23, 1971  H. V. LICHTENBERGER ET AL  3,572,161
CONTROL ROD ANTIEJECTION LATCH Filed July 8, 1969  2 Sheets-Sheet 1

INVENTOR.
H. V. LICHTENBERGER
L. A. BERTONE
BY
E L Kochey
ATTORNEY

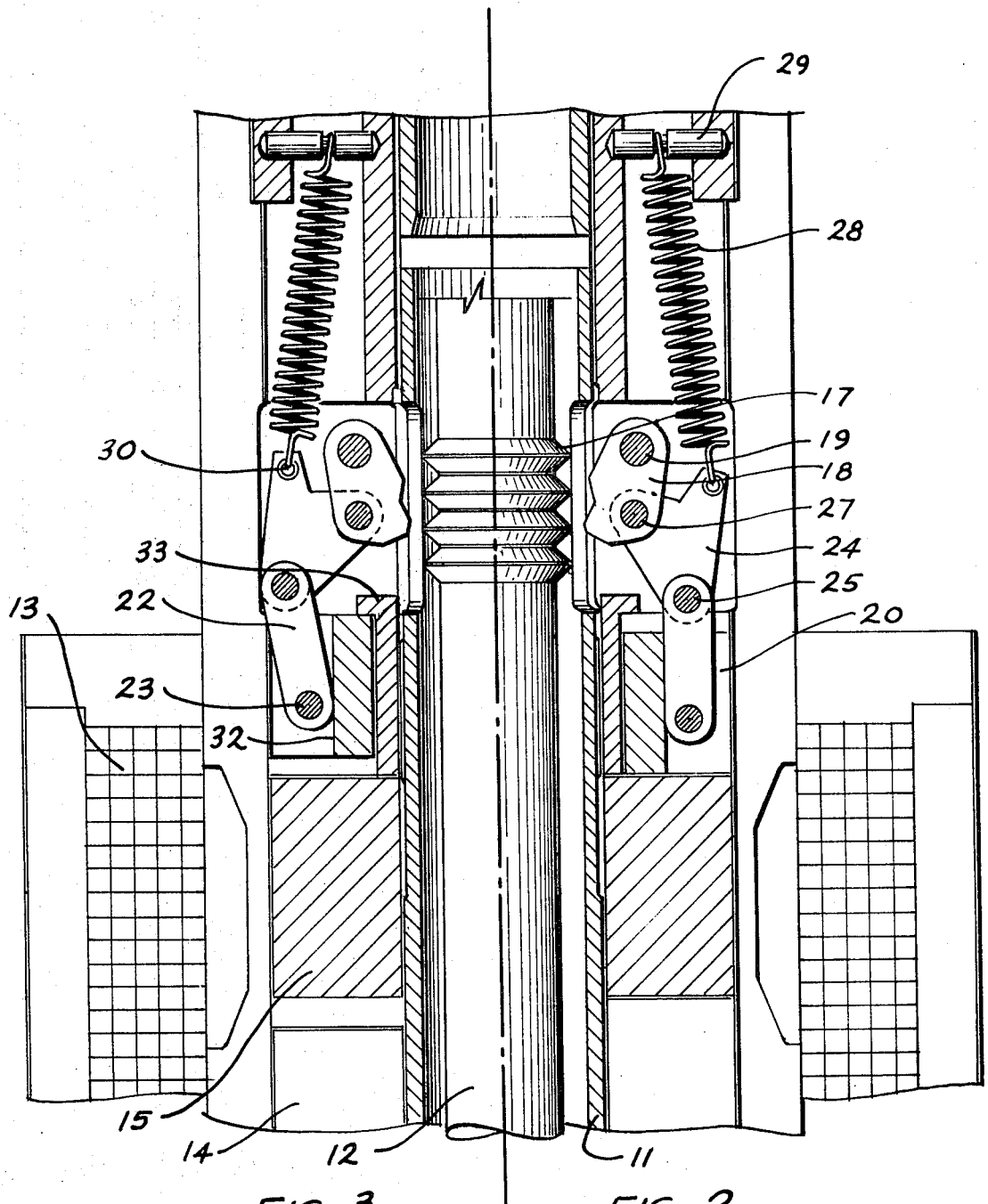

United States Patent Office 3,572,161
Patented Mar. 23, 1971

3,572,161
CONTROL ROD ANTIEJECTION LATCH
Harold V. Lichtenberger, West Simsbury, and Louis A. Bertone, Tariffville, Conn., assignors to Combustion Engineering, Inc., Windsor, Conn.
Filed July 8, 1969, Ser. No. 839,915
Int. Cl. G05g 5/06; H02k 4/00
U.S. Cl. 74—527       10 Claims

ABSTRACT OF THE DISCLOSURE

A nuclear reactor control rod antiejection latch for use with magnetic jacking type control rod drives and having a pawl which rachets to allow insertion of the control rod, but which prevents withdrawal unless the control rod life coil is energized. A pivotally mounted locking pawl normally engages the control rod and is positively disengaged when an unlocking slug is drawn down by the lifting coil. A connecting link is pivotally attached to both the pawl and a link on the slug. The connecting link has a spring force exerted upwardly on it. The location of the pivoted connections and the spring force is such that ratcheting of the pawl occurs without displacement of the slug and against a lesser spring force than is acting on the slug.

BACKGROUND OF THE INVENTION

This invention relates to nuclear reactors and particularly to control rod drive mechanisms of the magnetic jacking type. It prevents ejection of the control rod during an accident condition but allows scram of the control rod at any time.

In a magnetic jacking type control rod drive the control rod is moved through a plurality of stepping actions. Electromagnetic coils surround the control rod housing and are sequentially operated to perform a number of lifting steps. Certain coils will energize gripper assemblies which engage with axially spaced grooves on a control rod extension. Other coils will operate to lift at least one of the gripper assemblies a short distance. Another gripper may be engaged to hold the control rod in this position so that the first gripper may be disengaged and lowered in preparation for gripping and raising another step. These grippers are arranged so as to disengage the control rod extension on loss of power, thereby permitting the reactor to be scrammed even though power is not available to the jacking means. This is accomplished by letting the control rods fall under the influence of gravity.

In the event of a rapid pressure excursion within the reactor, it is possible that the control rods will be driven upwardly out of the core. This will then result in a rapid power increase within the core and possible concomitant damage to the reactor and surroundings. If the magnetic jacking unit is engaged at the time of this pressure excursion, that unit itself will hold the control rods in the core. Should, however, the unit be de-energized, control rod ejection is possible. While it is desirable that this control rod ejection be prevented, it is important also that there be little or no resistance to a free fall of the control rods so that the reactor may be readily scrammed during an emergency situation.

German Pat. No. 1,206,102, issued June 16, 1966 to Franz Schreiber discloses a two link device for a control rod on a naval reactor. This device operates to prevent the control rod from falling out of the reactor in the event that the craft turns over. An unlocking slug operates to release the latch during the lift portion of the jacking movement. In order to scram the control rods using the device shown in the German patent, any ratcheting action of the locking pawl requires movement of the unlocking piston. This large mass which must be moved by the weight of the control rod provides substantial resistance and uncertainty as to the safe operation of the control rod under the free fall condition.

SUMMARY OF THE INVENTION

In our invention the antiejection latch comprises a three link mechanism. One link is a pawl pivotally connected to the housing and adapted to selectively engage the control rod extension. A second link is a slug link pivotally connected to the unlocking slug. A third link is a connecting link pivotally interconnecting the pawl and slug link and has a bias force applied thereon. This force is applied in such a manner as to exert a major force to return the locking slug from the magnetic field but exerts a minor force against the pawl. The pawl may rotate under the influence of a falling control rod against only the minor force and without movement of the unlocking slug.

The pawl is engaged with the control rod extension at all times unless the lifting coil is activated. The lifting coil is activated when associated gripper is engaged with the control rod extension and upward movement of the control rod must be permitted. For this reason the pawl is temporarily disengaged at that time. With the three link mechanism of our invention the latch offers little resistance to a falling control rod permitting it to freely ratchet down without movement of the relatively massive unlocking slug.

BRIEF DESCRIPTION OF THE DRAWINGS

FIG. 2 illustrates the latch withdrawn under the influence of the lifting coil; and FIG. 3 illustrates the latch pushed back under the influence of a downwardly moving control rod.

DESCRIPTION OF THE PREFERRED EMBODIMENT

Figure 1:
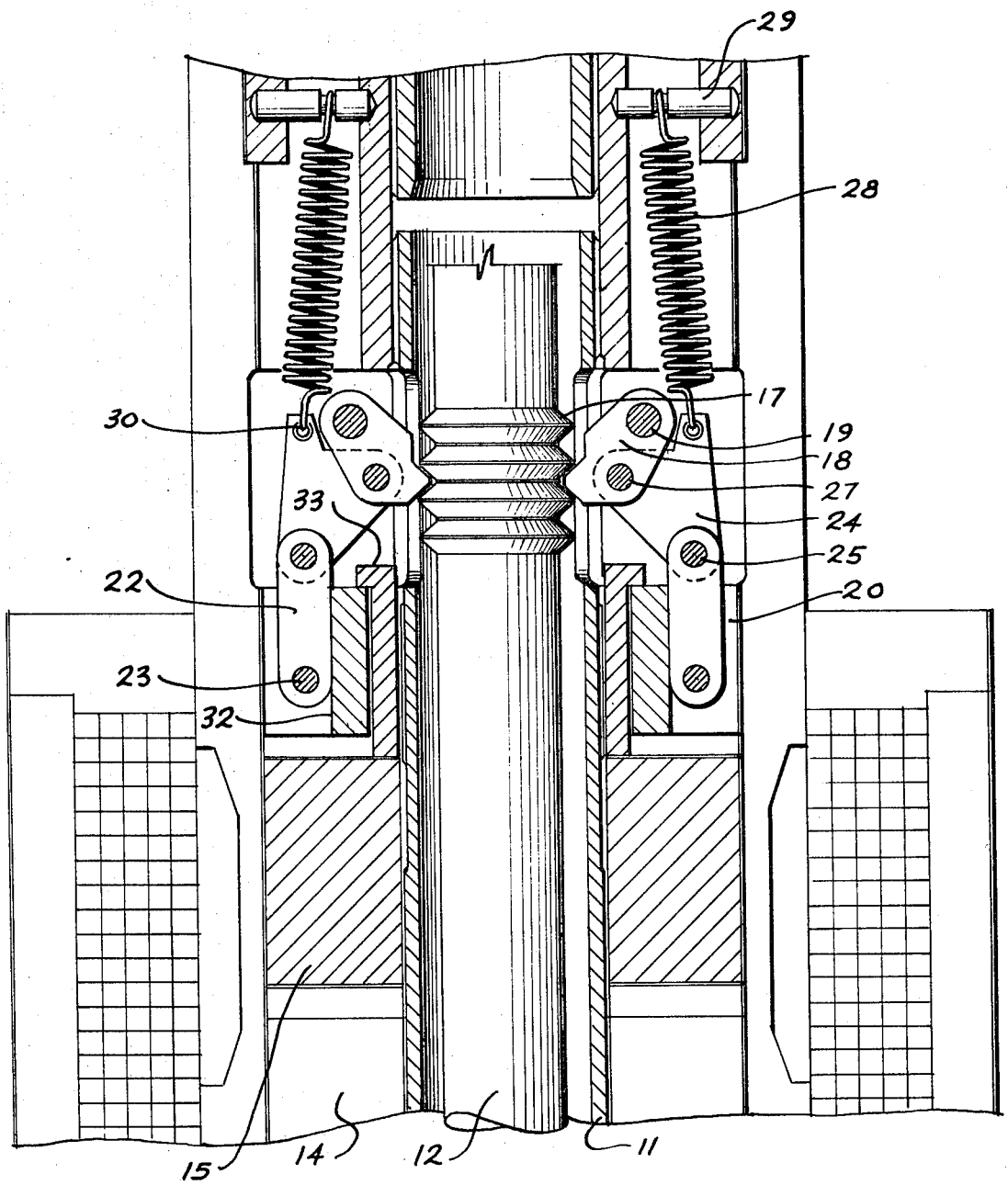
FIG. 1 is a sectional side elevation immediately above a magnetic jacking assembly illustrating the antiejection latch in the normal latched position.

Pressure tight housing 11 surrounds a control rod extension 12. This control rod extension has located on the lower end thereof control rods which are positioned within a nuclear reactor core. Lift coil 13 is illustrated which is the lifting coil of a magnetc jack type control rod drive such as illustrated in U.S. Pats. 3,122,027 and 3,158,766. Lifting slug 14 is pulled up against stop 15 when the lifting coil 13 is energized. The control rod extension 12 is intermittently connected to the lifting slug 14 so that the control rod may be raised through stepping action of the lifting slug 14. Axially spaced grooves 17 are located on the control rod extension and are used for the gripping assembies associated with the magnetic jack arrangement. Antiejection pawl 18 is pivotally connected to the housing at pin 19 and is arranged to selectively engage the axially spaced grooves on the control rod extension.

An unlocking slug 20 is axially movable along the housing and is located in the magnetic field of lifting coil 13. Slug link 22 is pivotally connected to the unlocking slug by pin 23 and extends generally vertically therefrom in the normal latched position. Connecting link 24 is pivotally connected to the slug link by pin 25 and is pivotally connected to the pawl by pin 27. Coil spring 28 is connected to the housing with pin 29 and is connected to the connecting link 24 at location 30.

The unlocking slug 20 has a vertical portion 32 which interferes with unlocking slug link 22 thereby preventing the link from moving inwardly of the vertical position. In the normal position, as illustrated in FIG. 1, the link is thereby prevented from moving inwardly while point 30 is located slightly outboard of a straight line drawn between the point of connection of the spring with pin 29 and pin 25. The spring thereby exerts substantial axial force tending to pull the slug 20 upwardly against stop 33. Since the natural released position would tend to put point 30 in a straight line, there is a minor axial force on connecting link 24. This, therefore, transmits force horizontally through pin 27 into pawl 18 so that the pawl is forced into engagement with grooves 17.

When the lifting coil is energized, the unlocking slug is drawn down, as illustrated in FIG. 2. The sum total distance between pins 23, and 25, 25 and 27, and 27 and 19 is sufficiently small that the pawl 18 is drawn back out of possible engagement with grooves 17. This permits upward movement of the control rod by the lifting slug 14. As the link moves into this unlocked position, the connecting link 24 rotates around pin 25 so that point 30 is increasingly displaced from the straight line position. The spring 28 at this time is exerting a major force against the pull of the magnetic field on slug 20 while it exerts an increased but still minor biasing force tending to move pawl 18 into engagement. The pin 27 is preferably located inboard of a straight line between pins 19 and 25 so as to assure rotation of the pawl into engagement when lifting coil 13 is de-energized. This position can be maintained by appropriate positioning of the linkage with respect to the unlocking slug stop 15.

FIG. 3 generally illustrates the position of the link when lifting coil 13 is de-energized but the pawl is pushed back under the influence of a downwardly moving control rod. The action is initiated by a force supplied by the grooves of the control rod downwardly against pawl 18. This causes the pawl to rotate around pin 19 thereby positioning the connecting link 24 radially away from the control rod. The motion of the connecting link causes movement of point 30 and also pin 25. The slug link 22 rotates around pin 23 so that the movement may be absorbed without any movement of the relatively heavy slug 20. Substantial axial force is still applied by spring 28 against the slug 20 while only a minor component of this force resists movement of the pawl. Movement of the pawl during this ratcheting action therefore requires translation of the relatively light link 24 and rotation only of slug link 22. There is also minor movement in the spring. It can be seen that a relatively low mass must be moved during the ratchehting action which occurs during a control rod scram. Therefore, minor resistance is offered and safety of operation is maximized.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention .

What we claim is:

1. In a magnetic jacking type control rod drive assembly having a housing, control rod extension within said housing having a plurality of axially spaced grooves thereon, a lifting slug axially movable within said housing for intermittently engaging and lifting said control rod extension, a lifting coil on said housing having a magnetic field for raising said lifting slug, a control rod antiejection latch comprising: an unlocking slug movable axially and located in said housing within a portion of the magnetic field of said lifting coil; a pawl pivotally connected to said housing and formed to selectively engage the grooves of said control rod extension; a slug link pivotally connected to said unlocking slug; a connecting link pivotally interconnecting said pawl and slug link, whereby on downward movement of said control rod extension said pawl may pivot around its connection to the housing without requiring movement of said locking slug; and means for biasing said pawl into engagement with said control rod extension, and said unlocking slug away from said lifting coil, the effective sum total of distance between the pivoted connections of said pawl, connecting link and slug link being sufficiently small to preclude engagement of said pawl with said control rod extension when said unlocking slug is pulled to an extreme position toward said lifting coil.

2. An apparatus as in claim 1 wherein said means for biasing comprises means for applying a major axial force on said connecting link while applying a minor radial force on said connecting link.

3. An apparatus as in claim 2 wherein said means for biasing comprises a coil spring connected to the housing at a location axially remote from said lifting coil, said spring being connected to said connecting link at a location outboard of straight line between the point of connection of said coil spring to said housing and the point of connection of said connecting link to said slug link.

4. An apparatus as in claim 3 wherein the point of connection between said pawl and said connecting link is inboard of straight line between the point of connection of said pawl and the housing and the point of connection of said connecting link and said slug link.

5. An apparatus as in claim 1 wherein said lower slug link which is pivotally connected to said lower slug is blocked by said lower slug to prevent movement inwardly of a generally vertical position.

6. An apparatus as in claim 1 wherein said housing includes an upper slug stop located immediately above said unlocking slug for limiting upward movement of said slug.

7. An apparatus as in claim 1 wherein said housing also includes a lower slug stop for limiting downward movement of said unlocking slug.

8. An apparatus as in claim 1 wherein said unlocking slug is located above the center line of said lifting coil and in the upper portion of the magnetic field of said lifting coil.

9. An apparatus as in claim 3 wherein said lower slug link which is pivotally connected to said lower slug is blocked by said lower slug to prevent movement inwardly of a generally vertical position.

10. An apparatus as in claim 9 wherein said housing includes an upper slug stop located immediately above said unlocking slug for limiting upward movement of said slug.

References Cited

UNITED STATES PATENTS

| 3,158,766 | 11/1964 | Frisch | 310—14 |
| 3,260,870 | 7/1966 | Beach, Jr., et al. | 310—14 |
| 3,299,302 | 1/1967 | Frisch | 310—14 |
| 3,449,603 | 6/1969 | Hursen | 310—14 |
| 3,480,807 | 11/1969 | Downs et al. | 310—14 |

FOREIGN PATENTS

| 405,718 | 11/1924 | Germany | 74—527 |
| 1,142,489 | 1/1963 | Germany | 74—527 |
| 1,174,621 | 7/1964 | Germany | 74—527 |

FRED C. MATTERN, JR., Primary Examiner

W. S. RATLIFF, JR., Assistant Examiner

U.S. Cl. X.R.

310—14